United States Patent [19]

Delling et al.

[11] Patent Number: 5,618,504
[45] Date of Patent: Apr. 8, 1997

[54] METHOD FOR RECOVERY OF ALKALI VALUES FROM TRONA USING SEQUENTIAL CRYSTALLIZATION

[75] Inventors: David R. Delling, Taos, N.M.; Vladimir M. Zolotoochin, The Woodlands; Francis M. Coustry, Houston, both of Tex.; Kevin L. Green, Green River, Wyo.

[73] Assignee: Solvay Minerals, Inc., Houston, Tex.

[21] Appl. No.: 438,447

[22] Filed: May 10, 1995

[51] Int. Cl.$^6$ .......................................... C01D 1/00
[52] U.S. Cl. .......................................... 423/206.2
[58] Field of Search ............... 23/302 T; 423/206.2

[56] References Cited

U.S. PATENT DOCUMENTS

| | | | |
|---|---|---|---|
| 1,759,361 | 5/1930 | Miller et al. | 423/192 |
| 2,049,249 | 7/1936 | Cunningham | 423/421 |
| 2,161,711 | 6/1939 | Keep et al. | 423/197 |
| 2,343,080 | 2/1944 | Pike | 423/181 |
| 2,704,239 | 3/1955 | Pike | 423/190 |
| 2,770,524 | 11/1956 | Seaton et al. | 423/195 |
| 2,962,348 | 11/1960 | Selgin et al. | 423/206.2 |
| 3,131,996 | 5/1964 | Seglin et al. | 423/206.2 |
| 3,479,134 | 11/1969 | Warzel | 423/206.2 |
| 3,498,744 | 3/1970 | Frint et al. | 423/198 |
| 3,655,331 | 4/1972 | Seglin et al. | 423/207 |
| 3,780,160 | 12/1973 | Waggener et al. | 23/302 T |
| 3,991,160 | 11/1976 | Gancy et al. | 423/184 |
| 4,022,867 | 5/1977 | Gancy et al. | 423/184 |
| 4,039,617 | 8/1977 | Kuo | 423/186 |
| 4,044,097 | 8/1977 | Gancy et al. | 423/186 |
| 4,160,812 | 7/1979 | Conroy et al. | 423/421 |
| 4,179,493 | 12/1979 | Sadan | 423/279 |
| 4,202,667 | 5/1980 | Conroy et al. | 423/206.2 |
| 4,283,372 | 8/1981 | Frint et al. | 423/206.2 |
| 4,286,967 | 9/1981 | Booth, Jr. et al. | 23/298 |
| 4,344,650 | 8/1982 | Pinsky et al. | 423/206.2 |
| 4,401,635 | 8/1983 | Frint | 423/206.2 |
| 4,405,592 | 9/1983 | Nakaya et al. | 423/421 |
| 4,519,806 | 5/1985 | Copenhafer et al. | 23/302 T |
| 4,557,910 | 12/1985 | Meadow | 423/206.2 |
| 4,564,508 | 1/1986 | Fairweather et al. | 423/189 |
| 4,584,077 | 4/1986 | Chlanda et al. | 423/206.2 |
| 4,636,289 | 1/1987 | Mani et al. | 423/206.2 |
| 4,652,054 | 3/1987 | Copenhafer et al. | 423/206.2 |
| 4,654,204 | 3/1987 | Copenhafer et al. | 423/422 |
| 4,814,151 | 3/1989 | Benke | 423/206.2 |
| 4,869,882 | 9/1989 | Dome et al. | 423/206.2 |
| 5,043,149 | 8/1991 | Frint et al. | 423/206.2 |
| 5,198,145 | 3/1993 | Lobunez et al. | 423/206.1 |
| 5,238,664 | 8/1993 | Frint et al. | 423/206.2 |
| 5,262,134 | 11/1993 | Frint et al. | 423/184 |
| 5,270,023 | 12/1993 | May et al. | 423/182 |
| 5,283,054 | 2/1994 | Copenhafer et al. | 423/206.2 |

*Primary Examiner*—Steven Bos
*Attorney, Agent, or Firm*—Brinks Hofer Gilson & Lione

[57] ABSTRACT

A process for recovery of alkali values from trona ore comprising (a) dissolving the trona ore, (b) separating the insoluble material to obtain an alkali containing feed liquor, (c) cooling the feed liquor and crystallizing sodium bicarbonate and separating the bicarbonate crystals from the resulting mother liquor, (d) cooling the mother liquor and crystallizing sodium carbonate decahydrate and separating the decahydrate crystals from a weak liquor, and (e) treating the sodium carbonate decahydrate crystals to recover the alkali values therein.

41 Claims, 3 Drawing Sheets

METHOD FOR RECOVERY OF ALKALI VALUES FROM TRONA USING SEQUENTIAL CRYSTALLIZATION

BACKGROUND OF THE INVENTION

This invention relates to a method of recovering alkali values from trona ore. In particular, this invention relates to a sequential crystallization process to recover separately sodium bicarbonate and sodium carbonate from dissolved trona.

Trona ore is a mineral that contains about 90–95% sodium sesquicarbonate ($Na_2CO_3 \cdot NaHCO_3 \cdot 2H_2O$). A vast deposit of mineral trona is found in southwestern Wyoming near Green River. This deposit includes beds of trona and mixed trona and halite (rock salt or NaCl) which covers approximately 2,600 km$^2$. The major trona beds range in size from less than 428 km$^2$ to at least 1,870 km$^2$. By conservative estimates, these major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

One such valuable alkali produced from trona is soda ash (a commercial grade of sodium carbonate). Soda ash is one of the largest volume alkali commodities made in the United States. In 1992, trona-based soda ash from Wyoming comprised about 90% of the total U.S. soda ash production. Soda ash finds major use in the glass-making industry and for the production of baking soda, detergents and paper products.

A common method to produce soda ash from trona ore is known as the "monohydrate process," which consumes great quantities of water (a scarce and valuable resource in Wyoming) and energy. In that process, crushed trona ore is calcined (i.e., heated) at a temperature between 125° C. and 250° C. to convert sodium bicarbonate into sodium carbonate and form crude soda ash.

During calcination, the sodium sesquicarbonate in the trona ore breaks down into sodium carbonate, carbon dioxide and water. Also, calcination releases some of the organics associated with trona or trona shale.

The resulting crude sodium carbonate and the released organics are then dissolved in water. After dissolving the calcined trona, any undissolved solids are then removed and the solution is treated with activated carbon to remove some of the dissolved organics. The solution is then filtered. One of the perceived advantages of the monohydrate process is that calcined trona dissolves faster than raw trona. Another perceived advantage is that dissolved calcined trona produces a more concentrated sodium carbonate solution of about 30%, while dissolved raw trona produces a solution having only about 16% sodium carbonate plus 10% sodium bicarbonate.

The filtered solution of sodium carbonate is fed to an evaporative crystallizer where some of the water is evaporated and some of the sodium carbonate forms into sodium carbonate monohydrate crystals ($Na_2CO_3 \cdot H_2O$). A slurry containing these monohydrate crystals and a mother liquor is removed from the evaporators and the crystals are separated from the mother liquor. The crystals are then calcined, or dried, to convert it to dense soda ash. The mother liquor is recycled back to the evaporator circuit for further processing into sodium carbonate monohydrate crystals.

Presently, the monohydrate process consumes considerable amounts of water. When the trona is calcined, the natural water content is evaporated (as shown in Table 1, water makes up about 15% of the trona ore). Yet after that water is evaporated off, more water must be added to dissolve the calcined trona.

In addition to consuming water, the monohydrate process consumes and wastes considerable amounts of energy. Calcining equipment, for example, has only about 50% energy efficiency. Much energy is also wasted in calcining simply to raise the temperature of the sodium carbonate in the trona up to the calcining temperature even though the sodium carbonate itself does not undergo conversion. Finally, significant energy is wasted during calcining in evaporating naturally occurring water in the trona.

Another disadvantage of the monohydrate process is that the feed solution can only contain a maximum of about 30% sodium carbonate. The evaporative crystallizers could be more efficiently operated if a more concentrated feed solution were used.

Therefore, there is a need to provide a simple, energy-efficient and water-conserving process to recover alkali values from trona ore.

SUMMARY OF THE INVENTION

This invention is a method for recovering alkali values from underground trona deposits that saves energy and conserves water. In this invention, trona ore is dissolved in a heated solution to form an alkali-containing feed liquor that contains insoluble particles. By not initially calcining the trona ore, as is done in the monohydrate process, a major source of energy consumption is eliminated. Also, by not calcining the trona ore, the water naturally present in the trona can be recovered in the process and a major source of air pollution associated with trona calcination is eliminated.

The insoluble particles and any undissolved trona ore are removed from the feed liquor. These solids are washed with water. The resultant wash water and recovered trona ore are returned to the heated dissolving solution and the insolubles are disposed.

The feed liquor is cooled to a lower temperature and sodium bicarbonate crystals are precipitated, resulting in a mother liquor containing suspended sodium bicarbonate crystals. The sodium bicarbonate crystals are separated from the mother liquor. The mother liquor is diluted to reduce the sodium bicarbonate concentration.

The diluted mother liquor is cooled to a lower temperature and sodium carbonate decahydrate crystals are precipitated, resulting in a weak liquor containing suspended sodium carbonate decahydrate crystals. The sodium carbonate decahydrate crystals are separated from the weak liquor.

The weak liquor is used to cool the feed liquor and then recycled back for use as the dissolving solution to dissolve the trona ore. This invention saves significant amounts of water compared to the monohydrate process, in this regard, because the weak liquor is recycled and considerably less fresh water is used to dissolve the trona.

The recovered sodium carbonate decahydrate crystals are melted and then passed to an evaporative crystallizer where sodium carbonate monohydrate crystals are precipitated, and water is evaporated. The evaporative crystallizer requires less energy to operate in this process because it is fed with a solution of melted decahydrate crystals that has a higher equivalent concentration of sodium carbonate than the feed solution in the monohydrate process.

The sodium carbonate monohydrate crystals are recovered from the crystallizers and separated from the liquor. The recovered sodium carbonate monohydrate crystals are dried into dense soda ash (a commercial form of sodium carbonate).

Likewise, the recovered sodium bicarbonate crystals can be dried into a sodium bicarbonate product, or it can be calcined and converted to light soda ash (a commercial form of sodium carbonate). The light soda ash can be combined with some of the filtrate liquor to create sodium carbonate monohydrate crystals or used in any other process to densify light soda ash. The monohydrate crystals are dried into dense soda ash.

The water evaporated from the evaporative crystallization step is useful for recycling back into the process. This water can be used to dilute the mother liquor before the sodium carbonate decahydrate crystals are precipitated. Also, the water may be recycled and used for washing the insoluble particles and dissolved trona ore.

Thus, this invention offers several advantages over the monohydrate process. This invention saves energy by eliminating the calcining of the trona ore and by feeding a more concentrated solution to the evaporative-crystallizer.

Also, this invention saves water by eliminating the calcining of the trona ore and by using a recycled weak liquor to dissolve the trona. Surprisingly, this invention has these advantages even though the feed solution is more diluted than the feed solution prepared by the monohydrate process.

Further advantages of this process will be apparent from the following detailed description.

DETAILED DESCRIPTION OF THE INVENTION

This invention is very advantageous for the production of dense soda ash, or sodium carbonate, as compared to producing the same through the monohydrate process. The present invention, in all its embodiments, is perhaps best understood by reference to the process flow diagram in FIG. 1.

Figure 1:
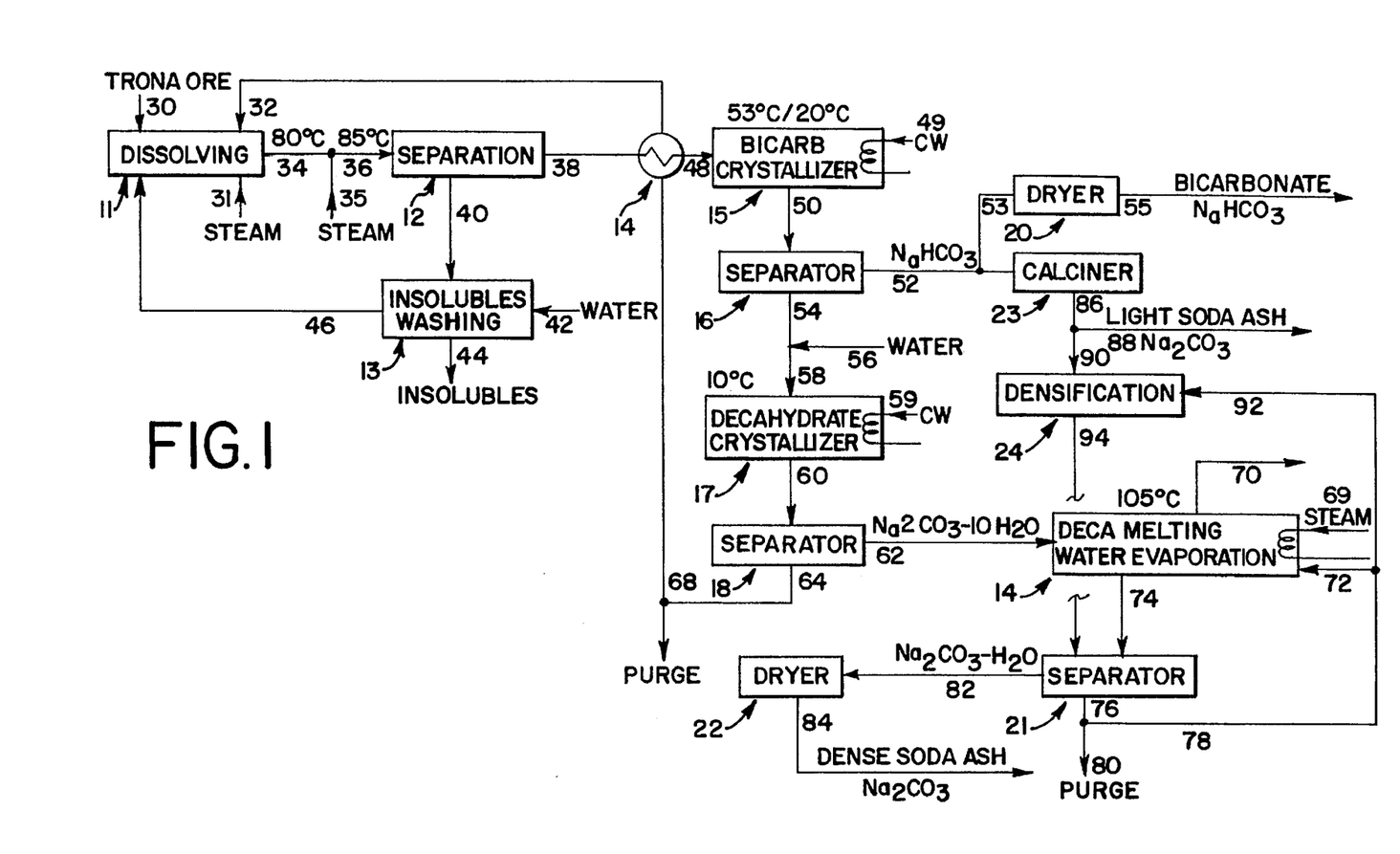
FIG. 1 is a block process flow diagram of the present invention.

Basically, in overview, the invention provides a process for dissolving trona ore in a leaching circuit 11 at a relatively warm temperature to produce feed liquor richer in sodium carbonate than found naturally in trona. The insoluble material is filtered from the feed liquor in the separator 12. Any alkali values are removed from the insolubles in the insolubles washing 13 and recycled to the leaching circuit 11. The insoluble material is disposed.

The feed liquor is cooled to precipitate sodium bicarbonate in the bicarbonate crystallizer 15 and form a mother liquor. The bicarbonate crystals are removed and fed to a calciner 23 for conversion to light soda ash. The light soda ash may be fed to a densifier 24 and mixed with a low sodium carbonate solution to create sodium carbonate monohydrate crystals.

The mother liquor is diluted and cooled to precipitate sodium carbonate decahydrate in the decahydrate crystallizer 17 and form a weak liquor. The decahydrate crystals are separated from the weak liquor and then melted. The melted decahydrate is heated and the water evaporated to form sodium carbonate monohydrate crystals in the evaporate crystallizer 19. The monohydrate crystals are removed and fed to a calciner 22 to convert to dense soda ash.

The weak liquor is passed through a heat exchanger 14 to cool the feed liquor and heat the weak liquor. The heated weak liquor is fed to the dissolving circuit 11 as the primary dissolving solution for the trona ore.

Now, in describing one embodiment of the invention in detail, as shown in FIG. 1, the process begins by taking an alkali-containing ore, such as trona ore, and introducing it into a leaching circuit 11. The leaching circuit may include either a dissolving trommel or an agitated dissolving tank. Typically, trona ore is mined underground and then transferred to the surface. Generally, additional crushing or screening of the mined trona ore is not required before placing it into a dissolving trommel, but would be required if a dissolving tank were used. For the purpose of describing the invention here, a dissolving tank 11 is used hereafter.

A heated dissolving solution is added via line 32 to the dissolving tank 11. The goal for dissolving the trona ore is to achieve a feed liquor coming out of the dissolving tank 11 through line 34 with sufficient sodium carbonate and sodium bicarbonate concentration so that sodium bicarbonate crystals will precipitate out when the feed liquor is later cooled, as discussed below. Therefore, the trona is dissolved in a dissolving solution that has been heated to a temperature between about 35° C. and 110° C. This will produce a feed liquor having a total equivalent carbonate concentration of at least about 13%. For the purposes of discussion here, "total equivalent carbonate" means the concentration of sodium carbonate in solution plus the concentration of sodium bicarbonate in solution expressed as the equivalent weight of sodium carbonate.

For economic purposes, it is desirable that the resultant feed liquor contain as much dissolved sodium carbonate and sodium bicarbonate as possible. But on the other hand, it is desirable that the dissolving temperature not be so high as to require expensive pressure retaining equipment. Green River, Wyo., is at a high altitude, about 6,500 feet, where water boils at about 95° C. Therefore, for operations at Green River, it is preferred that the trona be dissolved at a temperature between about 70° and about 90° C. Still, it is most preferred that the trona be dissolved at a temperature of about 80° C. To control the temperature, steam is added directly or by means of heat exchanger, via line 31, into the dissolving tank 11.

In the dissolving tank 11, it is important to maintain, not only the temperature, but also the ratio of trona feed to dissolving solution. Insufficient amounts of trona will result in an unsaturated feed liquor having lower concentrations of sodium carbonate and sodium bicarbonate, resulting in reduced yields and inefficient operations. Excess amounts of trona may result in other difficulties.

One of the difficulties with excess trona may occur when dissolving at temperatures above 80° C. A saturated feed solution may form with too high a total equivalent carbonate concentration. This may result in the potential crystallization of some decemite ($Na_2CO_3 \cdot 3NaHCO_3$) during the sodium bicarbonate crystallization step. To avoid decemite precipitation, the dissolving temperature should be below about 80° C. or total equivalent carbonate concentration in the feed liquor should be less than about 22%.

Another difficulty is that excess trona may cause sodium sesquicarbonate to crystallize when the leach solution is cooled if the leach concentration is such that the crystallization takes place along the line separating bicarbonate and sesquicarbonate fields. To avoid sesquicarbonate precipitation, the sodium carbonate concentration in the feed liquor should be not more than about 16% at the most preferred dissolving temperature of about 80° C. At dissolving temperatures of about 70° C. and about 90° C., the sodium carbonate concentration in the feed liquor should be not more than about 16.5% and 15%, respectively. If the feed solution were to exceed these limits, then the feed could be diluted to bring the concentrations within these aforementioned limits before being passed to the sodium bicarbonate crystallization step. However, if the sodium bicarbonate product is to be calcined into light soda ash, then the decemite and sodium sesquicarbonate precipitation may not be a significant cause for concern except that liquid-solids separation may be a possible problem. During the subsequent calcination, these crystals will also be converted into soda ash.

Likewise, excess trona should be minimized to avoid precipitating sodium bicarbonate crystals in the leaching circuit. A build up of sodium bicarbonate in the leaching circuit may reduce the sodium carbonate decahydrate yields.

With proper operation at the most preferred dissolving temperature of 80° C., the feed liquor preferably will have a concentration of sodium bicarbonate of about 10% and of sodium carbonate of about 15.5%, with a total equivalent carbonate concentration about 21.5% and a specific gravity of about 1.215. From the foregoing, one skilled in the art should readily understand that simple density measurements and visual inspections for undissolved trona may be used to monitor the leaching circuit for proper operation.

The dissolved alkali feed liquor in line 34 contains suspended insoluble particles and possibly undissolved trona ore. Heat, via steam line 35, is added directly (or indirectly through a heat exchanger) to the raw alkali feed liquor in order to maintain the temperature between 80° C. and 85° C. Feed liquor 36 is then passed to the insolubles separator 12.

Alternatively, the dissolved alkali feed liquor 34, along with any small undissolved particles of trona ore and insoluble shale, will exit the dissolving tank 11 through a solids classifier into a surge tank (not shown). The oversized material will then pass through a wet crusher and return to the feed end of the dissolving tank 11. The feed liquor in the surge tank will contain some undissolved solids and therefore should be agitated. The feed liquor in the surge tank will need to be maintained at a temperature of about 85° C. so that the dissolved alkali will not precipitate out. As demanded, the feed liquor will be sent to the insolubles separator 12.

In the insolubles separator 12, the coarse solids are first removed by a solids classifier, and then the solution is filtered through a pressure filter. This separator 12 can be a combination of a number of different equipment known to those skilled in the art. Equipment such as belt filters, pressure filters, drum filters, rake or screw classifiers, and thickeners may be used. The liquor is then polish filtered. The clear liquor may then be stored in a bicarbonate crystallizer feed tank (not shown) and the temperature maintained at 85° C.

The solids removed from the separator 12 are then passed to an insoluble wash tank 13. The wash water is introduced through line 42 to recover the dissolved alkali removed with the solids as well as to further dissolve any excess trona and recycle it back via stream 46 to the dissolving tank 11. The washed insoluble particles are sent to a tailings disposal system via line 44. Instead of using clean water or condensate to wash the insolubles, some of the weak liquor from the decahydrate separator may be used for this purpose, but this may result in lower overall efficiency.

The clear feed liquor in line 38 exiting from the separator 12 may contain between about 12.5% and 17.0% sodium carbonate and between about 6.5% and about 11.5% sodium bicarbonate. Preferably, the feed liquor 38 contains about 16% sodium carbonate and about 10% sodium bicarbonate with a specific gravity of about 1.215 and a temperature of between 80° C. and 85° C.

As an alternative to preparing a feed liquor by dissolving mined trona, an aqueous solution containing sodium bicarbonate and sodium carbonate may be obtained from other sources. For example, an aqueous solution may be obtained from solution mining of trona deposits. In this case, the trona is dissolved underground with water, and then pumped to the surface. Another source of an aqueous solution may be a by-product or waste stream from another alkali process.

As shown in FIG. 1, the feed liquor in line 38 is passed to a heat exchanger 14 to cool the feed liquor with the weak liquor recycled from the decahydrate separator 18 via line 68. It is desired to cool the feed liquor to between about 10° C. and about 40° C. Preferably, the feed liquor should be cooled to between 17° C. and about 23° C. Most preferably, the feed liquor is cooled to about 20° C. Because the weak liquor comes from the decahydrate separator 18 preferably at a temperature of about 10° C., it can be used as a primary source of pre-cooling. However, a separate cooling water stream in line 49 is necessary for further cooling and maintaining a precise temperature in the bicarbonate crystallizer 15.

As the feed liquor is cooled, sodium bicarbonate crystals form. Therefore, the feed liquor cooler 14 may be an integral part of the bicarbonate crystallizer 15. Although a separate crystallizing tank may be used, good quality crystals can be obtained by cooling and crystallizing the sodium bicarbonate in a tower crystallizer or column crystallizer. The sodium bicarbonate crystals that will be obtained from cooling in one step from about 80° C. down to about 20° C. may tend to be small. It is possible to obtain bigger size sodium bicarbonate crystals by cooling the feed liquor in several stages. Better quality, larger size crystals can be obtained by first cooling and crystallizing sodium bicarbonate at a temperature of between about 47° C. and about 60° C., and then cooling and further crystallizing sodium bicarbonate at a second temperature of between about 17° C. and about 23° C. Most preferably, the feed liquor is first cooled to about 53° C. and then further cooled to about 20° C.

After crystallization, a slurry of the sodium bicarbonate crystals and the liquor is transferred via line 50 to a separator 16. From this separator 16, which may be a belt filter, a centrifuge or a settling tank, for example, sodium bicarbonate crystals are removed via line 52. If the trona was dissolved at about 80° C. and then cooled to 20° C., then the mother liquor removed via line 54 from the separator 16 has a concentration of about 17% sodium carbonate and about 4% sodium bicarbonate.

The sodium bicarbonate crystals which are removed from the separator 16 may be transferred to a bicarbonate calciner 23 via line 52 where the crystals can be dried to yield a sodium bicarbonate product or are calcined and dried into a light soda ash. The light soda ash can then be transferred to storage via line 88 for sale as a separate product or it may be transferred via line 90 to a densifier 24 where the light soda ash is converted to sodium carbonate monohydrate crystals. In this embodiment, it is preferred that all of the light soda ash be sent via stream 90 to the densifier for complete conversion into dense soda ash. By calcining only the sodium bicarbonate, compared to calcining all the trona ore in the monohydrate process, 65% less energy is used to convert the bicarbonate to carbonate for total production of dense soda ash from trona.

The mother liquor, preferably, is treated and prepared before being passed to the decahydrate crystallizer 17. Water is added through line 56 to the mother liquor in line 54 to dilute it so that the concentration of sodium bicarbonate entering the crystallizer 17 via line 58 is reduced. At preferred operating conditions, diluted mother liquor has a concentration of sodium bicarbonate of about 3.5% and a concentration of sodium carbonate of about 15.3%. The dilution insures that no sodium bicarbonate will precipitate out when the mother liquor is cooled to form sodium carbonate decahydrate crystals.

Diluted mother liquor is fed via line 58 to the decahydrate crystallizer 17 where the temperature is reduced. Depending on the operating parameters of the process, the mother liquor can be cooled down to a temperature of between about 0° C. and about 30° C. However, for practical purposes, the mother liquor should be cooled to a temperature of between about 5° C. and about 20° C. To operate the process efficiently, it is preferred that the mother liquor be cooled to a temperature of about 7° C. and about 12° C. It is most preferred that the mother liquor be cooled to a temperature of 10° C. Cooling water via line 59 is used to maintain the decahydrate crystallizer at the desired temperature. For practical considerations, a temperature of 10° C. permits circulation of the cooling water through a natural evaporative cooling tower during the grand part of the year because of the colder climate found in Wyoming. Therefore expensive chilling equipment is likely not necessary to be used in this process the grand part of the year when the desired temperature can be achieved with cooling tower water.

The sodium carbonate decahydrate crystals that are formed are generally more fragile than the sodium bicarbonate crystals. Therefore, the equipment used to crystallize the sodium carbonate decahydrate must be selected appropriately. It is considered that a settling tank with gentle agitation may be well suited for sodium carbonate decahydrate crystallization, as well as, perhaps, an evaporative cooling crystallizer. Of course, the equipment selected may also be influenced by the climate in which the plant is expected to operate. Because the trona ore deposits are found in Wyoming, the colder weather may be advantageously used to effect the cooling of the solutions. One skilled in the art should realize that this may also influence the temperatures to which the mother liquor is to be cooled and the crystals precipitated, for optimizing the energy efficiency of the process.

A slurry is formed in the crystallizer 17 that contains sodium carbonate decahydrate crystals and weak liquor. The slurry is passed via line 60 to a separator 18. The separator 18, which may be a low RPM centrifuge or other gentle separation equipment, separates sodium decahydrate crystals from the resulting weak liquor. The decahydrate crystals are passed via line 62 to a decahydrate melting tank and evaporative crystallizer 19. The weak liquor from the separator 18 in line 64 is split, with the majority of the weak liquor recycled back via line 68 and 32 as the dissolving solution to the dissolving tank 11.

Generally, about 5% of the total weak liquor coming from the decahydrate separator 18 is purged via line 66 to reduce the impurities, such as organics or chlorides, in the system. Because the trona ore is not calcined, less organics are dissolved into the feed liquor. Generally, the monohydrate process is able to operate with approximately 30 to 66 ppm of organic material (TOC) in the feed to the crystallizer liquor. It is expected that the process practiced according to this invention will also be able to operate with similar amounts of organics, and therefore will require less purge.

Likewise, it is expected that this invention will be able to operate suitably with a level of chlorides and irons in the feed liquor as in the monohydrate process. Chloride levels of about 0.4% and an iron content of 1 to 4 ppm in the feed liquor of a monohydrate process is typically seen, but is not expected to be a problem for this invention. However, because, in this invention, weak liquor is recycled back to the dissolving tank 11, concentrations of these contaminants can build up in the system. Therefore, it is necessary that some of the weak liquor be purged. The sodium carbonate decahydrate crystals that precipitate are relatively pure. That is, the decahydrate crystals will not carry the impurities with it via line 62 into downstream processing. Therefore, most all of the contaminants will build up in the weak liquor that is separated from the decahydrate crystals. The purge stream eliminates some of the contaminants from the system via line 66 and keeps them at a tolerable level. This purge stream can be used to dispose the insoluble particles as tailings returned to spent trona mines.

The sodium carbonate decahydrate crystals that are transferred via line 62 to the evaporative crystallizer 19 are first melted. The decahydrate crystals are typically melted and heated to about 50° C. in a melting tank 19$f$, and then passed into the last effect 19$e$ of a multiple effect evaporator, see FIG. 3, for example. For the multiple effect evaporator, the melting tank 19$f$ acts as a surface condenser for the vapor from the last effect 19$d$. The heat is absorbed by the melting decahydrate crystals. The temperature of this unit is maintained by the regulation of steam fed via line 69$b$. As the melted decahydrate advances through the multiple effects, water is evaporated from the solution. The solution becomes supersaturated and sodium carbonate monohydrate crystals precipitate.

The temperatures and feed supplied into the evaporator effects are generally driven by product demand. However, the first effect should be operated below 110° C. so that the slurry removed from this effect via line 74 contains sodium carbonate monohydrate crystals. Above 110° C., anhydrous sodium carbonate crystals are produced. For example, in this embodiment, in FIG. 1, a four stage multiple effect evaporator may be used where effects 1 through 4 are operating at the temperatures of 105° C., 94° C., 83° C. and 72° C., respectively, to produce sodium carbonate monohydrate. The last effect basically is the surface condenser for the evaporator.

This evaporative crystallization step is substantially the same as is known in the prior art monohydrate process. However, one major disadvantage of the monohydrate process is that dissolved calcined trona is filtered and then introduced into the evaporators having a maximum concentration of about 30% sodium carbonate. In the present invention, the melted sodium carbonate decahydrate fed into the evaporators has an "equivalent" 37% concentration of sodium carbonate. By "equivalent," it is to be understood that the sodium carbonate decahydrate has melted into a solution having the maximum concentration of sodium carbonate in the solution of about 30%, plus about an additional 7% of sodium carbonate in crystalline form. This means that less water need be evaporated to obtain a slurry of sodium carbonate monohydrate, with a corresponding 29% savings in energy.

The slurry is passed via line 74, see FIG. 1 to a separator 21 that typically is a centrifuge. Sodium carbonate monohydrate crystals are removed from the resulting filtrate liquor and passed via line 82 to a drier, or calciner, 22. In the calciner 22, typically a rotary-type steam or gas heated drier, the crystals undergo a phase change to anhydrous sodium carbonate. The free moisture and the water of crystallization is heated and driven off to produce dense soda ash, removed via line 84.

The filtrate liquor that leaves the separator 21 via line 76 may be recycled back to the evaporator 19 via lines 78 and 72. Also, some of the filtrate liquor 92 may be fed to the densifier 24 via line 92 to densify the light soda ash and produce a sodium carbonate monohydrate crystal that may be added directly via line 94 to the monohydrate separator 21. If necessary a small purge stream of the filtrate liquor may be removed via line 80 to maintain any contaminants at a low tolerable level. However, because sodium carbonate decahydrate crystals are formed in a very pure state, very few of the impurities will pass to the evaporative crystallizer 19.

Table 2 provides an example of flow rates for the major streams for the above-described process as depicted in FIG. 1 and operated at the most preferred conditions. The material balance is based on all the sodium bicarbonate crystals being calcined and further processed into dense soda ash.

TABLE 2

| Stream Reference | FLOW RATES (tons/hr) | | | |
|---|---|---|---|---|
| | $NaHCO_3$ | $Na_2CO_3$ | $H_2O$ | Total (including others) |
| 30 | 48.89 | 61.68 | 20.97 | 141.44 |
| 38 | 74.51 | 112.54 | 539.45 | 726.46 |
| 52 | 47.38 | — | 6.67 | 54.07 |
| 54 | 27.16 | 113.37 | 552.57 | 693.10 |
| 56 | — | — | 45.23 | 45.23 |

TABLE 2-continued

| Stream Reference | FLOW RATES (tons/hr) | | | |
|---|---|---|---|---|
| | $NaHCO_3$ | $Na_2CO_3$ | $H_2O$ | Total (including others) |
| 62 | — | 61.15 | 103.94 | 165.10 |
| 64 | 26.94 | 53.55 | 492.76 | 573.22 |
| 68 | 25.61 | 50.91 | 468.45 | 544.97 |
| 66 | 1.33 | 2.64 | 24.32 | 28.29 |
| 70 | 4.94 | — | 84.30 | 89.24 |
| 82 | — | 90.63 | 15.41 | 106.04 |
| 72 | 9.65 | 49.13 | 118.03 | 176.82 |
| 80 | 0.07 | 0.81 | 1.85 | 2.73 |
| 90 | — | 29.90 | — | 29.90 |
| 84 | — | 89.00 | — | 89.00 |
| 44 | — | — | 3.96 | 13.86 |
| 42 | — | — | 13.70 | 13.70 |
| 35 | — | — | 5.30 | 5.30 |

Figure 3:
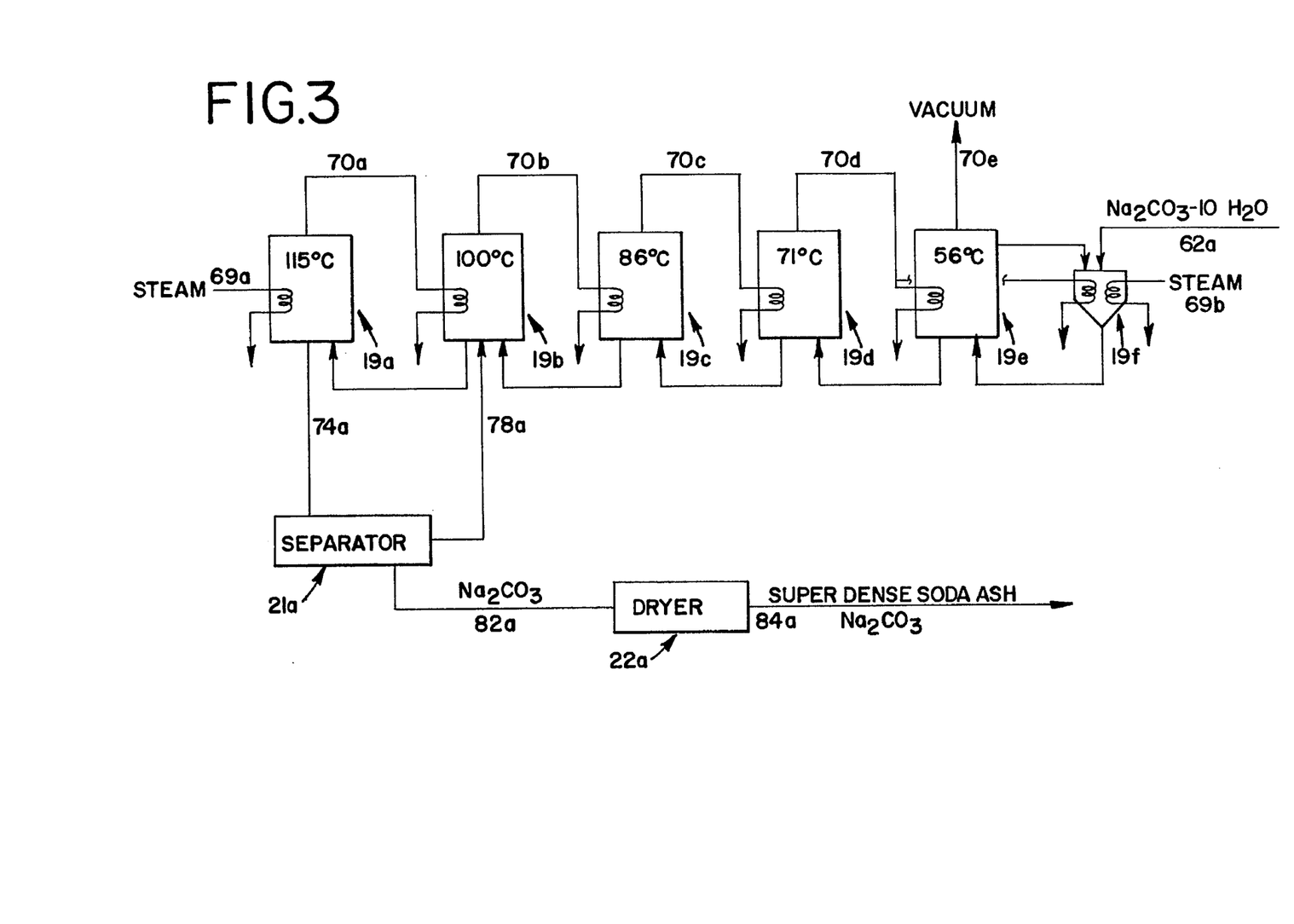
FIG. 3 is a block process flow diagram of one embodiment of a multi-stage evaporative crystallization process for processing the melted sodium carbonate decahydrate crystals.

In an alternative embodiment for the decahydrate melting and evaporation 19, FIG. 3 depicts a five stage multiple effect evaporator where anhydrous sodium carbonate crystals are formed. To obtain anhydrous sodium carbonate crystals, the first effect of the evaporator must be operated above 110° C. By operating the effects 1–5 at temperatures of 115° C., 100° C., 86° C., 71° C. and 56° C. respectively, anhydrous sodium carbonate may be efficiently produced. The anhydrous sodium carbonate crystals are passed via line 82a to a dryer where the free moisture is removed and super dense soda ash crystals are produced.

One advantage of producing anhydrous sodium carbonate crystals in the evaporative crystallizers, as compared with sodium carbonate monohydrate crystals, is that this final drying treatment of the crystals requires 85% less energy because only the free moisture is driven off and not the hydrate complexed with the crystal. Therefore, further energy savings are realized by this drying step in this embodiment.

One skilled in the art may appreciate that another advantage of this invention is that some equipment from an existing monohydrate process plant may be used for practicing this invention. As described above, the sodium carbonate decahydrate crystals that are melted are sent into an evaporative crystallizer. These evaporative crystallizers are generally the most expensive part of a dense soda ash production plant. Therefore, it is very cost efficient to retrofit an existing monohydrate process plant for producing dense soda ash according to this invention.

Because most monohydrate processes use multiple effect evaporative crystallizers, the same equipment can be retrofitted for use with the melted sodium carbonate decahydrate crystals produced by this invention. The sodium carbonate decahydrate crystals have a higher equivalent concentration of sodium carbonate, 37% compared to 30% for the monohydrate process, when it is melted before passing into the evaporative crystallizers. Thus, higher throughputs may be obtained with the old equipment retro-fitted for this new process.

Also, some of the monohydrate crystal separator equipment and the same monohydrate crystal dryer may be retro-fitted used to produce dense soda ash according to this invention. Some of the equipment from the existing monohydrate process may not be needed, such as the trona ore calciner, for example. But, the calciner can be retro-fitted into a dissolving trommel for dissolving the raw trona ore that is used as the feed stock for the process according to the present invention. Therefore, one skilled in the art may readily adapt an existing monohydrate process plant and use much of the same equipment to practice this invention.

Figure 2:
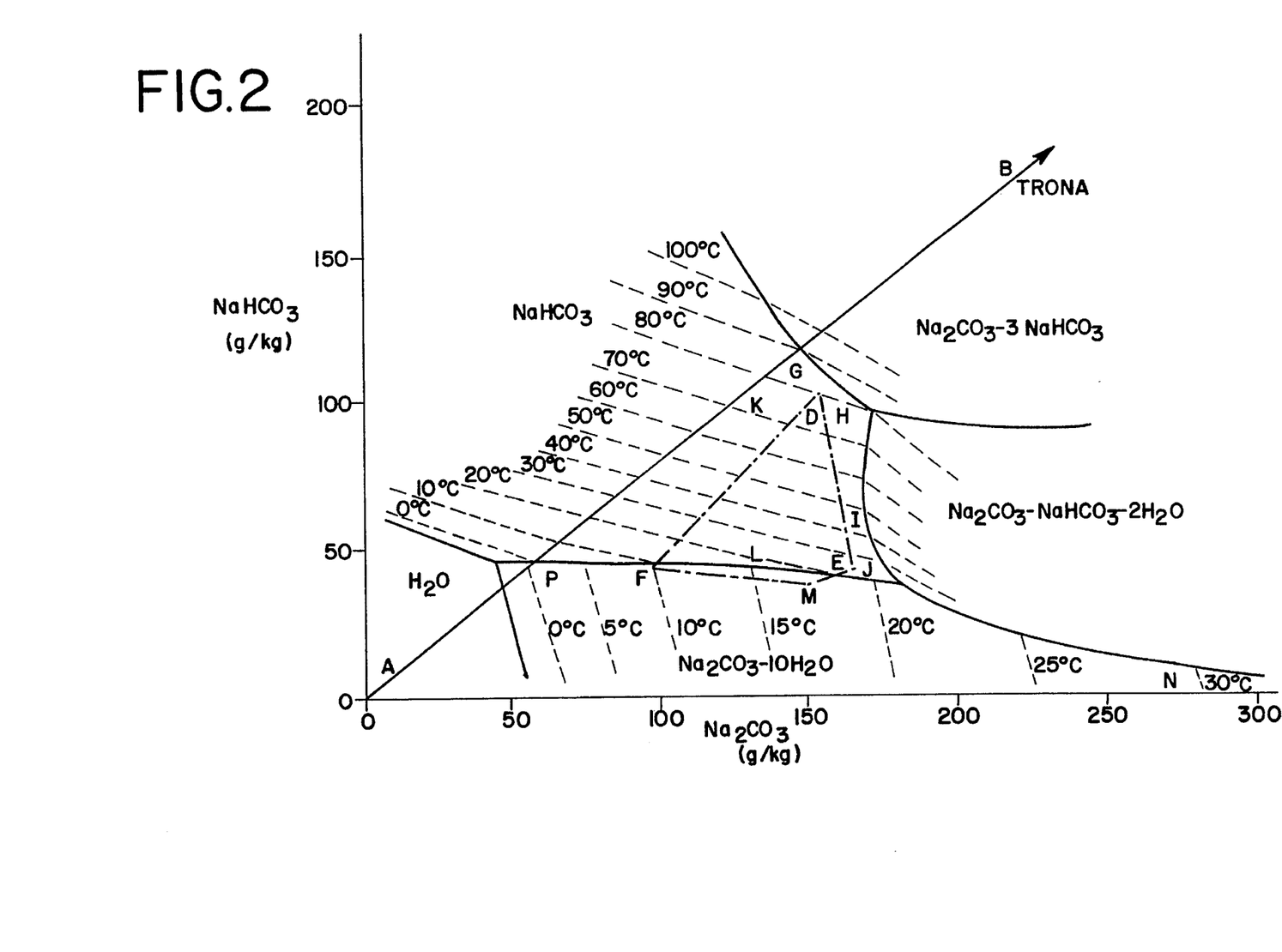
FIG. 2 is a phase diagram of the sodium carbonate, sodium bicarbonate and water system. This diagram depicts the relationship between the solid salts that will crystallize out at various concentrations of a saturated sodium carbonate and sodium bicarbonate aqueous solution. The diagram also includes some solubility isotherms over the relevant operating ranges of this invention.

The invention may be further understood, in all its various aspects, by a description of the process with reference to FIG. 2. FIG. 2 shows the phase diagram for a system of sodium carbonate, sodium bicarbonate and water. On this diagram, line AB shows the ratio of sodium carbonate and sodium bicarbonate found in trona.

The phase diagram, in FIG. 2, also shows the different regions where the different carbonate salts will precipitate from a saturated solution of sodium carbonate and sodium bicarbonate at various concentrations. Solubility isothermal lines are drawn over the relevant operating region of this invention.

The operation of this invention at the most preferred conditions is shown on the phase diagram by the polygon DEMF, in FIG. 2. In brief, the sides of the polygon represent the following operations. Line DE represents the cooling of the feed liquor from about 80° C. down to about 20° C. with the sodium bicarbonate precipitating in the heat exchanger 14 and crystallizer 15, as shown in FIG. 1. Line EM represents the treating, by dilution, of the resultant mother liquor. This corresponds, in FIG. 1, to the addition of water through line 56 into the slurry in line 54 exiting the separator 16. Line MF represents the cooling of the treated mother liquor from about 20° C. down to about 10° C. with sodium carbonate decahydrate precipitating in the crystallizer 17, as shown in FIG. 1. Line FD represents the heating of the resultant second mother liquor, or weak liquor, from about 10° C. up to about 80° C. and dissolving trona therein to produce the feed liquor. This corresponds, in FIG. 1, to the weak liquor exiting the separator 18 through lines 64 and 68, passing through heat exchanger 14 and entering the dissolving tank 11 through line 32, where trona enters through line 30 to be dissolved.

One skilled in the art may understand from this diagram that this invention may be practiced in a multitude of ways at various operating conditions to effect sequential crystallization of sodium bicarbonate and sodium carbonate decahydrate. A description of some of the different variations may illustrate this further.

Generally speaking, by dissolving trona at the preferred temperature range, a feed liquor is produced with a concentration that is found in FIG. 2 in the region noted by the letters G and H. The precise concentration will depend on the temperature and the leach conditions such as the amount of trona used, residence time and agitation. For example, if trona were perfectly dissolved in water, the concentration of sodium carbonate and sodium bicarbonate at various dilutions could be found along line AB.

However, by using a recycle stream of weak liquor from the decahydrate crystallizer separator 18 as the dissolving solution, a feed liquor concentration can be achieved with a ratio of sodium bicarbonate to sodium carbonate of less than 0.8. For most efficient operation, it is desirable to have the ratio between about 0.5 and about 0.8, and the total equivalent carbonate concentration between about 20% and 22%.

Although the feed liquor may be cooled and bicarbonate crystals precipitated out from any aqueous solution having concentrations within the bicarbonate precipitation region on the phase diagram, the feed liquor may be first treated to maximize the recovery of the sodium bicarbonate crystals. The recovery of sodium bicarbonate can be maximized by preparing a feed liquor with relative concentrations of the sodium carbonate and sodium bicarbonate in the region between the letters G and H.

It is important that the concentration of sodium carbonate and sodium bicarbonate remains to the left of the invariant line separating the sodium bicarbonate crystallization zone and the decemite ($Na_2CO_3 \cdot 3NaHCO_3$) zone and to the left of the sodium sesquicarbonate zone, because it is desired that only sodium bicarbonate crystals precipitate out at this stage. If the feed liquor has too rich a concentration of sodium bicarbonate and sodium carbonate, the feed liquor may be diluted in order to get the concentrations in the proper zone. On the other hand, if the trona ore is dissolved at too low of a temperature resulting in a weak feed liquor, the feed liquor may be further concentrated by evaporation.

One skilled in the art may realize that there are many ways for changing the concentrations of sodium carbonate and sodium bicarbonate in the feed liquor, or any aqueous solution containing the same constituents, in order to obtain the desired concentrations. It is preferred to have between about 12.5% and 16.5% sodium carbonate and between 6.5% and 11.5% sodium bicarbonate in this feed liquor. Still it is most preferred to have about 16% sodium carbonate and about 10% sodium bicarbonate in the feed liquor before cooling the liquor and precipitating bicarbonate crystals. Some of these treatment methods used to achieve the concentrations may include converting some of the sodium bicarbonate into sodium carbonate by steam stripping, evaporation, carbonation techniques, or adding caustic, for example, or converting some of the sodium carbonate into sodium bicarbonate by absorbing $CO_2$. Also, additional alkali containing material may be dissolved into the liquor to increase the constituent concentrations.

Regardless of the technique used to obtain the desired concentrations of sodium carbonate and sodium bicarbonate, the feed liquor should be cooled to a temperature between 10° C. and 40° C. to precipitate an economic yield of sodium bicarbonate crystals. The amount of sodium bicarbonate that will precipitate out can be determined by the isotherms shown in FIG. 2. As the feed liquor temperature is cooled, the solution becomes supersaturated with sodium bicarbonate which as a result precipitates out as a crystal. The relative concentrations of the resultant solution, or mother liquor, will be somewhere along the isotherm which, for example, at 40° C. may be at the area marked I on FIG. 2. It is preferred, however, that the feed liquor is cooled to a temperature between about 17° C. and about 23° C. It is desired that as much sodium bicarbonate be crystallized from the feed liquor as possible, such that the resultant mother liquor ratio of sodium bicarbonate to sodium carbonate will be reduced to less than 0.5. Thus, the temperature should be cooled down to as close as possible to the lower invariant line separating the sodium bicarbonate crystallization zone and the sodium carbonate decahydrate crystallization zone, in the region between J and L shown in the phase diagram.

Depending on the concentration of the feed liquor, the concentrations in the resultant mother liquor as the temperature drops may follow parallel paths from point D down to E, region H down to J, or K down to L. When it is desired to maximize the recovery of sodium carbonate with each pass, it is better to operate along the path from region H down to J so that the resultant mother liquor will have a higher concentration of sodium carbonate remaining for easier recovery. Conversely, if sodium bicarbonate is the more desirable product, then operating along the path from region G down to between E and L will maximize the bicarbonate recovery with each pass.

If the temperature is made too low so that the solution is cooled to below the lower invariant line bordering the sodium carbonate decahydrate precipitation zone, then sodium carbonate decahydrate crystals will begin to precipitate and this is to be avoided. Therefore, it is most preferred that the feed liquor be cooled to a temperature about 20° C.

The sodium bicarbonate crystals are then separated from the resultant mother liquor. About 60% of the sodium bicarbonate can be optimally removed from the feed liquor when operating at the preferred conditions. The bicarbonate crystals can then be treated as described in the above discussion referring to FIG. 1.

The resultant mother liquor can then be treated to prepare it for cooling and precipitation of sodium decahydrate crystals. Although the mother liquor may be immediately cooled, sodium bicarbonate crystals will still precipitate out a little bit as the temperature is driven down until the solution crosses over into the sodium carbonate decahydrate precipitation zone, as seen in FIG. 2. Therefore, in order to maximize the purity of the sodium carbonate decahydrate crystals that will form, it is preferred to treat the mother liquor in order to pass it from the sodium bicarbonate crystallization zone to the sodium carbonate decahydrate zone without any crystals being formed.

As readily seen in FIG. 2, this treatment may be done by any technique that will further reduce the concentration of sodium bicarbonate in the mother liquor. Dilution is one method to reduce the concentration of sodium bicarbonate from the mother liquor. However, the more the mother liquor is diluted the more cooling is required to obtain the same yield of sodium carbonate decahydrate crystals. For example, if the mother liquor is diluted from point E to beyond point M, it may be necessary to cool to point P to obtain the same yield as cooling from M to F.

Instead of dilution, the sodium bicarbonate in the mother liquor may be converted to sodium carbonate. This can be done by adding caustic soda, for example. Practically all of the sodium bicarbonate may be converted to sodium carbonate so that a solution is reached with a concentration that falls somewhere in the region noted in FIG. 2 by letter N. If this solution were saturated, then decahydrate crystals could form at a temperature about 30° C.

Regardless of the technique to reduce the sodium bicarbonate concentration in the mother liquor, whether it be merely by dilution or by adding alkali-containing material into the mother liquor, the treated mother liquor is then cooled until the liquor becomes supersaturated with sodium carbonate causing sodium carbonate decahydrate crystals to precipitate. The mother liquor can be cooled down to a temperature of between about 0° C. and 32° C., depending on the concentration of the treated mother liquor fed to the decahydrate crystallizer. However, for practical purposes, the mother liquor should be cooled to a temperature of between about 5° C. and about 20° C. To efficiently operate the process, it is preferred that the mother liquor be cooled to a temperature of about 7° C. and about 12° C. It is most preferred that the mother liquor be cooled to a temperature of 10° C.

As the sodium carbonate decahydrate crystallizes, it removes a significant amount of water as part of the crystalline precipitate. It is important that the temperature of the mother liquor not be cooled too low in order to avoid the solution from becoming too concentrated in sodium bicarbonate again and crossing the invariant line back into the sodium bicarbonate crystallization zone, for example driving from point M to past point F. Likewise, it should not be cooled too low to avoid forming ice crystals that may contain impurities. This will help maintain the purity of the sodium carbonate decahydrate crystals that are precipitated out at this step.

The sodium carbonate decahydrate crystals are separated from the second resultant mother liquor, also referred to as weak liquor. The decahydrate crystals are fed to the melting tank and evaporative crystallizer for further treatment as described in the above discussion referring to FIG. 1.

The weak liquor that has been removed from the sodium carbonate decahydrate separator is recycled back into the process to dissolve the trona ore. To conserve energy the weak liquor can be used to cool the feed liquor to the sodium bicarbonate crystallizer, which correspondingly heats up the weak liquor to near the temperature required for dissolving the trona ore. Although the weak liquor is dilute compared to the feed liquor, it still has a higher ratio of sodium carbonate to sodium bicarbonate compared to what is naturally found in trona. Using weak liquor to dissolve trona will result in a feed liquor solution that has a higher concentration of sodium carbonate to sodium bicarbonate than is found in the trona itself. Accordingly, the feed liquor will then have the concentration that will always be found to the right of the trona line AB, in FIG. 2.

This invention, as heretofore described, has numerous advantages over the prior art monohydrate process. Significant energy savings are realized by eliminating the step of calcining the trona ore. Further energy savings are achieved by feeding a more concentrated equivalent sodium carbonate solution to the evaporative crystallizer. Even more energy savings may be realized by producing anhydrous sodium carbonate crystals in the evaporative crystallizers so that less energy is required to dry the final dense soda ash product. Further, the cold climate of Wyoming is exploited for minimizing the costs required to cool the process streams for the crystallization of sodium bicarbonate and sodium carbonate decahydrate.

Moreover, significant reduction of water consumption is realized by this invention. By eliminating the step of calcining the trona ore, the natural water contained in the trona is added to the process. Rather than using fresh water, the trona is dissolved with a recycled low carbonate solution. Also, fresh water requirements may be supplied from recycled water evaporated in the evaporative crystallizer.

A further advantage is found in the low capital requirements for this invention because existing equipment of a monohydrate process may be retro-fitted for an increased throughput production in accordance with this invention.

It is therefore intended that the foregoing detailed description be regarded as illustrative rather than limiting, and that it be understood that it is the following claims, including all equivalents, which are intended to define the scope of this invention.

What is claimed is:

1. A method of recovering alkali values from underground trona deposits which comprises:

(a) dissolving an alkali-containing ore in a heated dissolving solution to form a dissolved alkali feed liquor having suspended therein insoluble particles;

(b) removing the suspended insoluble particles from the feed liquor;

(c) cooling the feed liquor and precipitating sodium bicarbonate crystals thereby forming a mother liquor;

(d) separating sodium bicarbonate crystals from the mother liquor;

(e) cooling the mother liquor and precipitating sodium carbonate decahydrate crystals thereby forming a weak liquor;

(f) separating sodium carbonate decahydrate crystals from the weak liquor; and (g) heating the weak liquor and recirculating it as the dissolving solution in step (a); and (h) recovering alkali values from the sodium carbonate decahydrate crystals.

2. The method of claim 1, wherein step (a) is carried out at a temperature between about 35° C. and about 110° C.

3. The method of claim 1, wherein step (a) is carried out at a temperature between about 70° C. and about 90° C.

4. The method of claim 1, wherein step (a) is carried out at a temperature of about 80° C.

5. The method of claim 1, wherein the feed liquor contains about 16% sodium carbonate and about 10% sodium bicarbonate.

6. The method of claim 1, wherein the mother liquor contains about 17% sodium carbonate and 4% sodium bicarbonate.

7. The method of claim 1, wherein the feed liquor in step (c) is cooled to between about 10° C. and about 40° C.

8. The method of claim 1, wherein the feed liquor in step (c) is cooled to between about 17° C. and about 23° C.

9. The method of claim 1, wherein the feed liquor in step (c) is cooled to about 20° C.

10. The method of claim 1, wherein step (c) includes cooling to a first temperature between about 47° C. and about 60° C. and then cooling to a second temperature between about 17° C. and about 23° C.

11. The method of claim 1, wherein the mother liquor in step (e) is cooled to between about 0° C. and about 30° C.

12. The method of claim 1, wherein the mother liquor in step (e) is cooled to between about 5° C. and about 20° C.

13. The method of claim 1, wherein the mother liquor in step (e) is cooled to between about 7° C. and about 12° C.

14. The method of claim 1, wherein the mother liquor in step (e) is cooled to about 10° C.

15. The method of claim 1, further comprising the step of diluting the mother liquor to reduce the sodium bicarbonate concentration to less than about 4.0% before cooling the mother liquor.

16. The method of claim 1, wherein step (h) includes heating sodium carbonate decahydrate crystals and forming sodium carbonate monohydrate.

17. The method of claim 16, wherein the sodium carbonate monohydrate crystals are dried to form dense soda ash.

18. The method of claim 17, wherein sodium bicarbonate crystals are calcined to form light soda ash.

19. The method of claim 18, wherein light soda ash is densified to form sodium carbonate monohydrate crystals.

20. The method of claim 1 wherein step (h) includes melting sodium carbonate decahydrate crystals, evaporating water therefrom to form sodium carbonate monohydrate crystals, and drying sodium carbonate monohydrate to form dense soda ash.

21. The method of claim 20, wherein sodium bicarbonate crystals are calcined to form light soda ash, and the light soda ash is combined with the melted sodium carbonate decahydrate.

22. The method of claim 1, wherein sodium bicarbonate crystals are dryed or are dissolved and recrystallized into a refined bicarbonate crystal product.

23. The method of claim 16, wherein the insoluble particles are washed by water evaporated from the melted sodium carbonate decahydrate.

24. The method of claim 1, wherein the feed liquor in step (c) is cooled by indirect heat exchange with the weak liquor in step (g).

25. The method of claim 1, wherein step (h) is carried out in equipment designed for and used in an existing sodium carbonate monohydrate process that has been retro-fitted.

26. The method of claim 1, wherein step (a) is carried out underground in a trona deposit.

27. The method of claim 1, wherein the alkali-containing ore is trona ore that has been mined and crushed.

28. The method of claim 1, wherein step (h) includes heating sodium carbonate decahydrate crystals and forming anhydrous sodium carbonate.

29. A method of recovering alkali values from an aqueous solution comprising sodium carbonate and sodium bicarbonate, the method comprising:

(a) providing a first feed liquor containing sufficient sodium carbonate and sodium bicarbonate in solution such that sodium bicarbonate crystals will precipitate upon cooling of the feed liquor;

(b) cooling the feed liquor, precipitating sodium bicarbonate crystals and collecting the sodium bicarbonate crystals from a resulting first mother liquor;

(c) adjusting the concentration of sodium carbonate and sodium bicarbonate in the first mother liquor to obtain a second feed liquor containing sufficient sodium carbonate and sodium bicarbonate such that sodium carbonate decahydrate crystals will precipitate upon cooling of the second feed liquor;

(d) cooling the second feed liquor, precipitating sodium carbonate decahydrate crystals and collecting the sodium carbonate decahydrate crystals from a resulting second mother liquor; and (e) recovering the alkali values from the sodium bicarbonate and sodium carbonate decahydrate crystals.

30. The method of claim 29, wherein step (c) comprises diluting the first mother liquor with an aqueous solution.

31. The method of claim 29, wherein step (c) comprises evaporating the first mother liquor.

32. The method of claim 29, wherein step (c) comprises introducing alkali containing material into the first mother liquor.

33. The method of claim 29, wherein step (c) comprises converting some of the sodium bicarbonate therein into sodium carbonate.

34. The method of claim 29, wherein step (c) comprises converting some of the sodium carbonate therein into sodium bicarbonate.

35. The method of claim 29, wherein the first feed liquor contains between about 12.5% and 17.0% sodium carbonate and between 6.5% and 11.5% sodium bicarbonate.

36. The method of claim 29, wherein the first feed liquor contains about 16% sodium carbonate and about 10.0% sodium bicarbonate.

37. The method of claim 29, wherein the second feed liquor contains more than about 10% sodium carbonate and less than about 4% sodium bicarbonate.

38. The method of claim 29, wherein the second feed liquor comprises about 15.0% sodium carbonate and about 3.5% sodium bicarbonate.

39. The method of claim 29, wherein the first feed liquor of step (a) is prepared from an aqueous solution comprising second mother liquor.

40. A method of recovering alkali values from trona ore, the method comprising:

(a) dissolving trona ore in a heated dissolving solution at a temperature between about 70° C. and about 90° C., to form a pregnant feed liquor, having suspended therein insoluble particles;

(b) removing the suspended insoluble particles from the feed liquor;

(c) cooling the feed liquor to a temperature between about 17° C. and about 23° C. and precipitating sodium bicarbonate crystals thereby forming a mother liquor;

(d) separating sodium bicarbonate crystals from the mother liquor;

(e) diluting the mother liquor to reduce the sodium bicarbonate concentration;

(f) cooling the mother liquor to a temperature between about 7° C. and about 12° C. and precipitating sodium carbonate decahydrate crystals thereby forming a weak liquor;

(g) separating sodium carbonate decahydrate crystals from the weak liquor;

(h) heating the weak liquor by indirectly exchanging heat with the feed liquor;

(i) recycling the weak liquor to make up the dissolving solution; and (j) recovering alkali values from the sodium carbonate decahydrate crystals.

41. The method of claim 40, further comprising the steps of:

(a) melting the sodium carbonate decahydrate crystals and evaporating the water therefrom, thereby forming a first slurry containing sodium carbonate monohydrate crystals;

(b) removing sodium carbonate monohydrate crystals from the slurry thereby forming a filtrate liquor;

(c) calcining the removed sodium carbonate monohydrate crystals to form dense soda ash;

(d) calcining the sodium bicarbonate crystals to form light soda ash;

(e) combining light soda ash with some of the flitrate liquor to form a second slurry containing sodium carbonate monohydrate crystals; and (f) adding the second slurry to the first slurry.

* * * * *